US012294047B2

(12) United States Patent
Lin et al.

(10) Patent No.: US 12,294,047 B2
(45) Date of Patent: May 6, 2025

(54) LAMINATOR FOR BATTERY ASSEMBLY

(71) Applicant: Rivian IP Holdings, LLC, Plymouth, MI (US)

(72) Inventors: Terri Chai Lin, Fremont, CA (US); Karthik Bhatt, San Jose, CA (US); Chao Ken Hsu, Fremont, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 212 days.

(21) Appl. No.: 17/889,966

(22) Filed: Aug. 17, 2022

(65) Prior Publication Data

US 2024/0063420 A1   Feb. 22, 2024

(51) Int. Cl.
| | |
|---|---|
| *B29C 65/00* | (2006.01) |
| *H01M 4/04* | (2006.01) |
| *H01M 10/04* | (2006.01) |
| *H01M 50/46* | (2021.01) |
| *B29C 65/78* | (2006.01) |
| *H01M 4/02* | (2006.01) |

(52) U.S. Cl.
CPC ....... *H01M 10/0404* (2013.01); *H01M 4/043* (2013.01); *H01M 10/0468* (2013.01); *H01M 50/46* (2021.01); *B29C 65/7894* (2013.01); *B29C 66/83413* (2013.01); *H01M 2004/021* (2013.01); *H01M 2004/027* (2013.01); *H01M 2004/028* (2013.01)

(58) Field of Classification Search
CPC ......... B29C 65/7894; B29C 66/83413; H01M 10/0404
See application file for complete search history.

(56) References Cited

U.S. PATENT DOCUMENTS

| | | | | |
|---|---|---|---|---|
| 2014/0020238 | A1* | 1/2014 | Yuhara | H01G 13/00 29/730 |
| 2015/0372325 | A1* | 12/2015 | Takai | B32B 38/1841 156/64 |
| 2020/0014062 | A1* | 1/2020 | Kaga | H01M 50/124 |
| 2020/0223202 | A1* | 7/2020 | Shintani | B32B 37/0053 |
| 2022/0052372 | A1* | 2/2022 | Shim | H01M 10/0463 |
| 2022/0173427 | A1* | 6/2022 | Inagaki | B65H 31/24 |
| 2022/0200038 | A1* | 6/2022 | Bae | H01M 10/0468 |
| 2022/0294024 | A1* | 9/2022 | Choi | H01M 50/46 |
| 2023/0246161 | A1* | 8/2023 | Su | H01M 4/366 29/221 |

* cited by examiner

*Primary Examiner* — Philip C Tucker
*Assistant Examiner* — Nickolas R Harm
(74) *Attorney, Agent, or Firm* — BAKERHOSTETLER

(57) ABSTRACT

Described are embodiments of a laminator and notcher system that pertains to batteries and methods of preparing batteries. In some embodiments, the system includes a laminator configured to densify an electrode film and a notcher configured to receive the densified electrode film from the laminator and cut the densified electrode film into a plurality of electrodes. A web path of the densified electrode film from the laminator to the notcher can have a bend angle greater than 165 degrees.

20 Claims, 15 Drawing Sheets

LAMINATOR FOR BATTERY ASSEMBLY

This disclosure relates generally to batteries and methods of preparing batteries, and more specifically, to a laminator system and methods of using such system to prepare batteries.

BRIEF SUMMARY

Due to physical constraints of the solid state cell, high density electrodes and close contact between these electrodes and solid electrolyte separators can be required to achieve high performance cells with high ionic conductivities. Unlike the assembly of traditional Li-ion battery components (which are flexible and malleable) that include liquid electrolytes, assembling solid-state batteries can be challenging due to the brittle nature of the high-density electrodes. Because the electrodes have a low porosity and a ceramic or glass-like consistency, it is difficult to run the electrodes through traditional roll-to-roll battery manufacturing processes without breaking them. Disclosed herein are systems and methods of assembling electrode and SES layers and densifying (e.g., increasing the density) them in order to improve the battery manufacturing process.

In some embodiments, a system includes: a laminator configured to densify an electrode film; and a notcher configured to receive the densified electrode film from the laminator and cut the densified electrode film into a plurality of electrodes, and a web path of the densified electrode film from the laminator to the notcher has a bend angle greater than 165 degrees. In some embodiments, the densified electrode film has a porosity of 0.5-15%. In some embodiments, the densified electrode film has a press density of 0.5-5 g/cm$^2$. In some embodiments, the system includes at least one electrode unwinder configured to unwind a roll of the electrode film. In some embodiments, the laminator is configured to receive the unwound electrode film from the at least one electrode unwinder. In some embodiments, the system includes at least one solid electrolyte unwinder configured to unwind a roll of a solid electrolyte film. In some embodiments, the laminator is configured to receive the unwound solid electrolyte film from the at least one solid electrolyte unwinder. In some embodiments, the laminator is configured to bond at least one surface of the electrode film to a surface of the solid electrolyte film to form the densified electrode film. In some embodiments, the laminator is configured to bond a first surface of the electrode film to a first solid electrolyte film and a second surface of the electrode film to a second solid electrolyte film to form the densified electrode film. In some embodiments, the solid electrolyte film comprises an electrolyte layer and a substrate layer and the electrolyte layer is bonded to the at least one surface of the electrode film. In some embodiments, the substrate layer is separated from the densified electrode film after lamination. In some embodiments, the system includes at least one rewinder configured to rewind the substrate layer from the densified electrode film. In some embodiments, the solid electrolyte film comprises an electrolyte layer and a substrate layer. In some embodiments, the substrate layer is separated from the unwound solid electrolyte film. In some embodiments, the system includes at least one rewinder configured to rewind the substrate layer from the unwound solid electrolyte film. In some embodiments, the laminator is configured to receive at least the electrolyte layer. In some embodiments, the laminator is configured to bond at least one surface of the electrode film to a surface of the electrolyte layer to form the densified electrode film. In some embodiments, the laminator is configured to bond a first surface of the electrode film to a first electrolyte layer and a second surface of the electrode film to a second electrolyte layer to form the densified electrode film. In some embodiments, the electrode film comprises a cathode film. In some embodiments, the electrode film comprises an anode film. In some embodiments, the electrode film comprises an electrode layer and a substrate layer. In some embodiments, the substrate layer of the electrode film is separated from the electrode layer. In some embodiments, the system includes at least one rewinder configured to rewind the substrate layer of the electrode film.

In some embodiments, a method of manufacturing solid-state batteries includes: densifying an electrode film in a laminator; feeding the densified electrode film along a web path from the laminator to a notcher with the web path having a bend angle greater than 165 degrees; and cutting the densified electrode film into a plurality of electrodes using the notcher. In some embodiments, the method includes unwinding a roll of the electrode film and feeding the unwound electrode film to the laminator. In some embodiments, the method includes unwinding a roll of a solid electrolyte film and feeding the unwound solid electrolyte film to the laminator. In some embodiments, the solid electrolyte film in the method includes an electrolyte layer and a substrate layer. In some embodiments, the method includes separating the substrate layer from the electrolyte layer of the solid electrolyte film prior to feeding the electrolyte layer to the laminator. In some embodiments, the method includes rewinding the substrate layer into a roll. In some embodiments, the method includes separating the substrate layer from the densified electrode film after the laminator. In some embodiments, the method includes rewinding the substrate layer into a roll.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

In the Figures, like reference numerals refer to like components unless otherwise stated herein.

DETAILED DESCRIPTION

Traditional lithium-ion (Li-ion) batteries conduct lithium ions from a negatively charged anode to a positively charged cathode through a liquid electrolyte. A separator, which is usually a sheet or roll of material that serves as an electrical insulator but is conductive to lithium ions, runs between the anode and cathode. During a discharge cycle, lithium atoms are ionized in the anode and are separated from their electrons by passing through the separator via the liquid electrolyte until they reach the cathode. The lithium ions then recombine with their electrons in the cathode, generating electricity in the process. Because traditional Li-ion batteries have high energy densities and are relatively low-maintenance, they are commonly used in consumer electronics and electric vehicles. However, traditional Li-ion batteries are dangerously combustive and can overheat and catch fire at high voltages.

On the other hand, solid-state batteries provide similar benefits without being combustive, thus alleviating many of the dangers posed by traditional Li-ion batteries. Unlike traditional Li-ion batteries that conduct ions through liquid electrolyte, solid-state batteries use solid electrolytes for ion transport. Solid-state battery cells contain layers of electrodes separated by solid electrolyte separators (SES).

Figure 1:
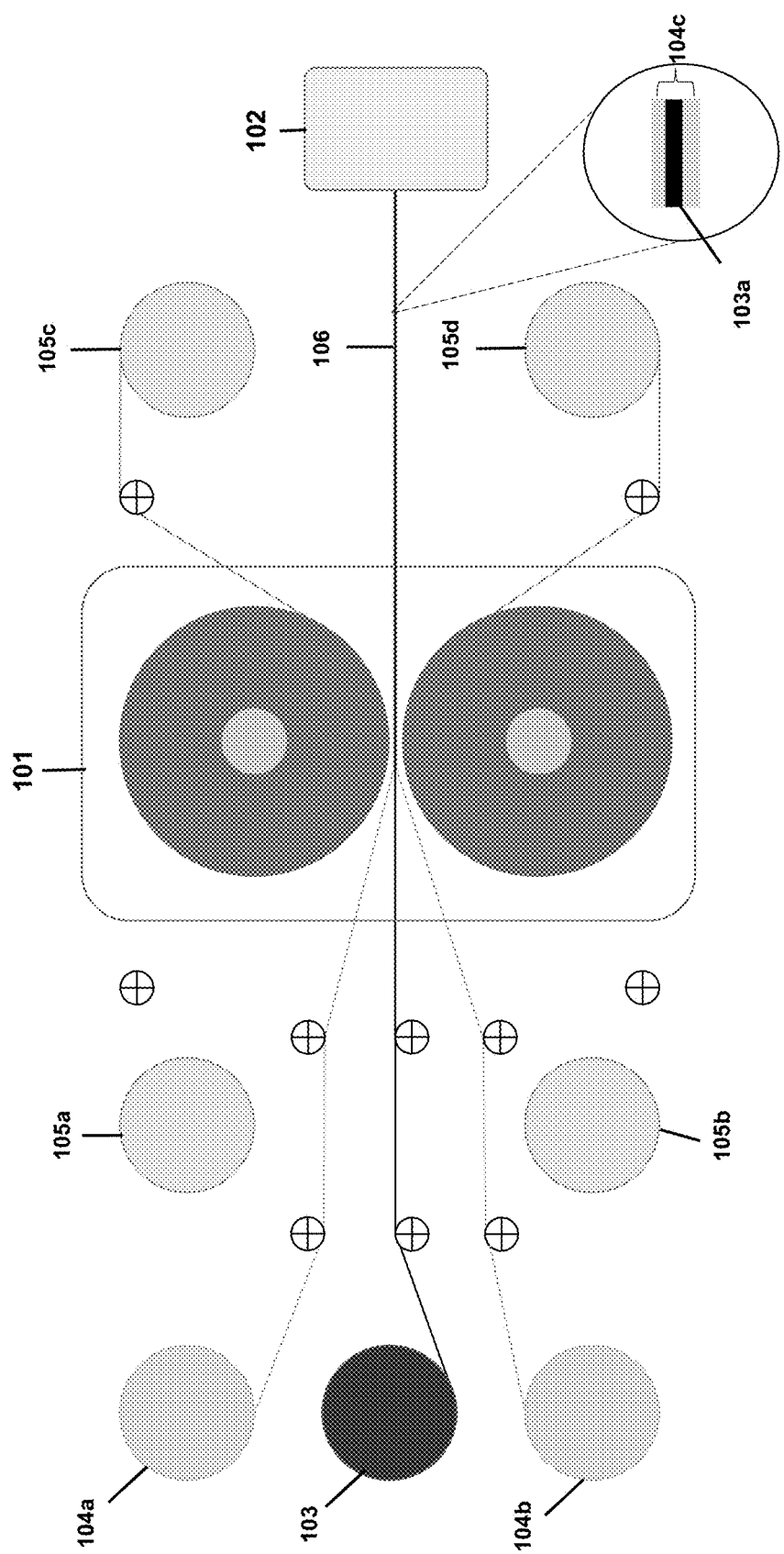
FIG. 1 illustrates an exemplary layout of a laminator and notcher system in accordance with some embodiments disclosed herein.

Disclosed herein are systems and methods of preparing electrodes and/or assembling electrode and SES layers and densifying (e.g., increasing the density) them to a final density to improve the battery manufacturing process. In some embodiments, a system can include a laminator. For example, FIG. 1 illustrates an exemplary layout of a system that can include a laminator 101. In some embodiments, laminator 101 can include a plurality of rollers (e.g., pressure rollers, hard rollers) to apply pressure to both sides of the electrode film. In some embodiments, laminator 101 can be used to assemble and densify components of a battery. In some embodiments, laminator 101 can be capable of densifying (e.g., increase the density of) an electrode film. In some embodiments, laminator 101 can operate at speeds of about 5 to about 100 m/s. In some embodiments, laminator 101 can exert pressures of about 0.5 tons to about 5 tons. In some embodiments, laminator 101 can apply temperatures of about 25° C. to about 150° C.

In some embodiments, the electrode film can include a current collector and at least one electrode layer. In some embodiments, the electrode film can be one or more electrode layers described herein without the current collector. In some embodiments, the electrode film can be only the current collector. In some embodiments, the electrode film can include a current collector and an electrode layer on each or both sides of the current collector. In some embodiments, the current collector can be a ribbon or foil. In some embodiments, the current collector can include a metal or metal alloy. In some embodiments, the metal can be aluminum, copper, nickel, iron, titanium, stainless steel, or combinations thereof. In some embodiments, the current collector can include a carbonaceous material. In some embodiments, the current collector can be coated with carbon. For example, the current collector may be a metal that is coated with carbon (e.g., carbon-coated aluminum foil).

In some embodiments, an electrode layer can be deposited on both sides of the current collector. As such, in some embodiments, the electrode film can have a corresponding structure (in order) of electrode layer, current collector, and electrode layer. In some embodiments, an electrode layer can be deposited on at least one side of the current collector via slot-die coating, microgravure coating, reverse comma coating, comma coating, physical vapor deposition, and/or extrusion coating. In some embodiments, the electrode layer can include electrode active materials, conductive carbon material, binders, and/or other additives. In some embodiments, the electrode active materials can include cathode active materials. In some embodiments, the cathode active materials can include high-nickel content (greater than or equal to about 80% Ni) lithium transition metal oxide. Such lithium transition metal oxides can include a particulate lithium nickel manganese cobalt oxide ("LiNMC"), lithium nickel cobalt aluminum oxide ("LiNCA"), lithium nickel manganese cobalt aluminum oxide ("LiNMCA"), lithium cobalt oxide (LCO), lithium manganese oxide (LMO), lithium metal phosphates like lithium iron phosphate ("LFP"), Lithium iron manganese phosphate ("LMFP"), and combinations thereof.

In some embodiments, the electrode active materials can include anode active materials. In some embodiments, the anode active materials can include graphitic carbon (e.g., ordered or disordered carbon with sp2 hybridization, artificial or natural Graphite, or blended), Li metal anode, silicon-based anode (e.g., silicon-based carbon composite anode, silicon metal, oxide, carbide, pre-lithiated), silicon-based carbon composite anode, lithium alloys (e.g., Li—Mg, Li—

Al, Li—Ag alloy), lithium titanate, or combinations thereof. In some embodiments, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell may not comprise an anode active material in an uncharged state.

In some embodiments, the conductive carbon material can include graphite, carbon black, carbon nanotubes, Super P carbon black material, Ketjen Black, Acetylene Black, SWCNT, MWCNT, carbon nanofiber, graphene, and combinations thereof. In some embodiments, the binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE"), carboxymethylcellulose ("CMC"), agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3, 4-ethylenedioxythiophene) polystyrene sulfonate (PEDOT-PSS), polyacrylic acid (PAA), poly(methyl acrylate) (PMA), poly(vinyl alcohol) (PVA), poly(vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or combinations thereof.

In some embodiments, an electrode layer can have a cathode active material of about 70-85 wt. %, about 70-75 wt. %, about 75-85 wt. %, or about 80-85 wt. % of the electrode layer. In some embodiments, an electrode layer can have an anode active material of about 30-85 wt. %, about 60-85 wt. %, about 30-60 wt. %, about 70-80 wt. %, or about 60-75 wt. % of the electrode layer. In some embodiments, an electrode layer can have binders of about 0.1-5 wt. %, about 0.5-3 wt. % or about 1-2 wt. % of the electrode layer. In some embodiments, an electrode layer can have a conductive carbon material of about 0.1-5 wt. %, about 0.1-2.5 wt. %, about 2.5-5 wt. %, or about 2-3 wt. % of the electrode layer. In some embodiments, an electrode layer loading on the current collector can be about 0.5-30 $mg/cm^2$, about 10-20 $mg/cm^2$, about 15-22 $mg/cm^2$, about 3-10 $mg/cm^2$ or about 1-5 $mg/cm^2$ on a side of the current collector. In some embodiments, an electrode layer can have a thickness of about 1-200 μm, about 100-150 μm, about 150-200 μm, about 50-150 μm or about 1-50 μm.

As stated above, the electrode film (e.g., current collector with at least one electrode layer on a side of it) can be laminated. In some embodiments, laminator 101 can be configured to receive the electrode film and apply pressure to the electrode film. In some embodiments, the electrode film can be laminated to a desired porosity. In some embodiments, a desired porosity may be about 0.5-15%, about 9-12%, about 10-12%, about 5-10%, about 0.5-5%, or about 12-15%. Porosity percentage can be defined as the ratio of the volume of the voids or pore space divided by the total volume. In some embodiments, press densities (after lamination) of the electrode film can be from about 0.5-5 $g/cm^2$, about 1-4 $g/cm^2$, about 1-3 $g/cm^2$, about 1-2 $g/cm^2$, or about 1.5-1.7 $g/cm^2$.

In some embodiments, an electrode film and a solid electrolyte film can be arranged in alternating layers upon entering the laminator (e.g., a structure in order of solid electrolyte film, electrode film, solid electrolyte film). The arrangement of the electrode film and solid electrolyte layers can depend on the desired configuration of the resulting battery cell component. In some embodiments, the solid electrolyte film can include at least one layer of a solid electrolyte. Solid electrolyte materials of the solid electrolyte layer can include inorganic solid electrolyte materials such as oxides, sulfides, phosphides, halides, ceramics, solid polymer electrolyte materials, hybrid solid state electrolytes, or glassy electrolyte materials, among others, or in any combinations thereof. In some embodiments, the solid electrolyte layer can include a polyanionic or oxide-based electrolyte material (e.g., Lithium Superionic Conductors (LISI-CONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride (Lix-POyNz), among others, or in any combinations thereof. In some embodiments, the solid electrolyte layer can include a glassy, ceramic and/or crystalline electrolyte material such as $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, lithium phosphorous oxy-nitride ($Li_xPO_yN_z$), lithium germanium phosphate sulfur ($Li_{10}GeP_2S_{12}$), Yttria-stabilized Zirconia (YSZ), NASI-CON ($Na_3Zr_2Si_2PO_{12}$), beta-alumina solid electrolyte (BASE), perovskite ceramics (e.g., strontium titanate (Sr-$TiO_3$)), Lithium lanthanum zirconium oxide ($La_3Li_7O_{12}Zr_2$), LiSiCON (Li2+2xZn1−xGeO4), lithium lanthanum titanate (Li3xLa2/3−xTiO3) and/or sulfide-based lithium argyrodites with formula $Li_6PS_5X$ (X=Cl, Br) like $Li_6PS_5Cl$, among others, or in any combinations thereof. Furthermore, solid state polymer electrolyte materials can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), and PEG, among others, or in any combinations thereof.

In some embodiments, the solid electrolyte film can include a substrate layer and an electrolyte layer. The substrate layer could be made out of a variety of materials, such as metal or plastic. The substrate layer can be free-standing such that it can be separated or peeled from the electrolyte layer without the application of pressure by the laminator. Free-standing substrates can be included in the solid electrolyte film to prevent a surface of the electrolyte layer from coming in contact with another surface while the solid electrolyte film is still in a rolled or wound configuration. Because free-standing substrates can include a plastic material that may not withstand the pressure applied by the laminator and may not be a desired component of the final densified film, free-standing substrates can be separated from the electrolyte layer and rewound before passing through the laminator.

In some embodiments, laminator 101 can be configured to bond at least one surface of the electrode film to a surface of the solid electrolyte film to form the densified electrode film 106. For example, laminator 101 can exert a sufficiently high pressure so that a surface(s) of the electrode film can bond to a surface(s) of a solid electrolyte film resulting in minimal voids or gaps. Such voids or gaps should be minimized because they can potentially decrease the battery cell life. In some embodiments, the electrolyte layer of the solid electrolyte film can be bonded to the at least one surface of the electrode film during lamination.

In some embodiments, the laminator 101 can bond one layer of the electrode film to one layer of the solid electrolyte film on one surface. In some embodiments, the laminator 101 can be configured to bond a first surface of the electrode film to a first solid electrolyte film and a second surface of the electrode film to a second solid electrolyte film to form the densified electrode film. If desired, the laminator 101 can bond the electrode film between layers of solid electrolyte film on both a first and second surface so as to sandwich the electrode film between layers of solid electrolyte film. In some embodiments, the layers/film exit the laminator 101 bonded together as a densified electrode film 106. In some embodiments, the laminator can densify an electrode film with a solid electrolyte layer(s) or film to a densified electrode film with a desired density and porosity. In some embodiments, a desired porosity may be about 0.5-15%, about 9-12%, about 10-12%, about 5-10%, about 0.5-5%, or about 12-15%. In some embodiments, press densities (after lamination) of the electrode film can be from about 0.5-5 g/cm$^2$, about 1-4 g/cm$^2$, about 1-3 g/cm$^2$, about 1-2 g/cm$^2$, or about 1.5-1.7 g/cm$^2$ In some embodiments, these density and porosity ranges can apply to the electrode layer and/or the solid electrolyte layers.

In some embodiments, the layers/film exit the laminator bonded together as a densified electrode film 106 without the need for additional materials or bonding agents. The laminator 101 is not limited for use in electrode and/or solid electrolyte lamination. In some embodiments, the laminator 101 can also be used for the assembly of other components of a battery cell such as a cathode, a separator, electrolyte layer, and/or an anode, for example.

In some embodiments, as illustrated in FIG. 1, the system can have a notcher 102 that is configured to receive the densified electrode film 106 from the laminator 101 and to cut the densified electrode film 106 into a plurality of electrodes. The configuration of notcher 102 can depend on the desired configuration of the battery cell component. For example, notcher 102 can cut the densified film into standalone electrodes, or it can cut electrodes that can be transferred into a magazine and/or stacked in alternating layers (e.g., of cathode, electrolyte, and anode) to build up a battery cell. In some embodiments, notcher 102 may be a roll to roll notcher. In some embodiments, notcher 102 may be a roll to sheet notcher. In some embodiments, notcher 102 may cut the densified film using mold cutting. In some embodiments, notcher 102 may cut the densified film using laser cutting. In some embodiments, notcher 102 may include varying notching parameters. In some embodiments, varying notching parameters can include line speed, burr size, and cutting accuracy.

The system can be configured so that laminator 101 feeds into notcher 102 in a manner that allows the battery cell to be assembled without destroying the densified electrode film 106, which can be very brittle. In some embodiments, the densified electrode film travels along a web path from the laminator 101 to the notcher 102. In some embodiments, the notcher is located in-line with the laminator. Being in-line with the laminator can mean that the web path of the densified electrode film between the laminator 101 and notcher 102 is kept as straight as possible such that the densified electrode film 106 bends as little as possible. To reduce the chance that the densified electrode film will break, the web path of the densified electrode film can have a bend angle greater greater than about 150 degrees, greater than about 155 degrees, greater than about 160, greater than about 165 degrees, greater than about 170 degrees, greater than about 175 degrees, or about 180 degrees. In some embodiments, the bend angle of the web path from the laminator to the notcher is about 150-180 degrees, about 155-180 degrees, about 160-180 degrees, about 165-180 degrees, about 170-180 degrees, or about 175-180 degrees.

As such, the densified electrode film 106 can be prevented from minimally bending in any direction so as to form an angle less than the bend angle relative to a neutral axis between the laminator exit and notcher entrance. In other words, this neutral axis can be a straight line (e.g., bend angle of 180) between the laminator exit and the notcher entrance. In some embodiments, the bend angle of other web paths before the laminator, such as the web path from the unwound electrode film to the laminator, can be greater than 165 degrees as well.

Figure 3A:
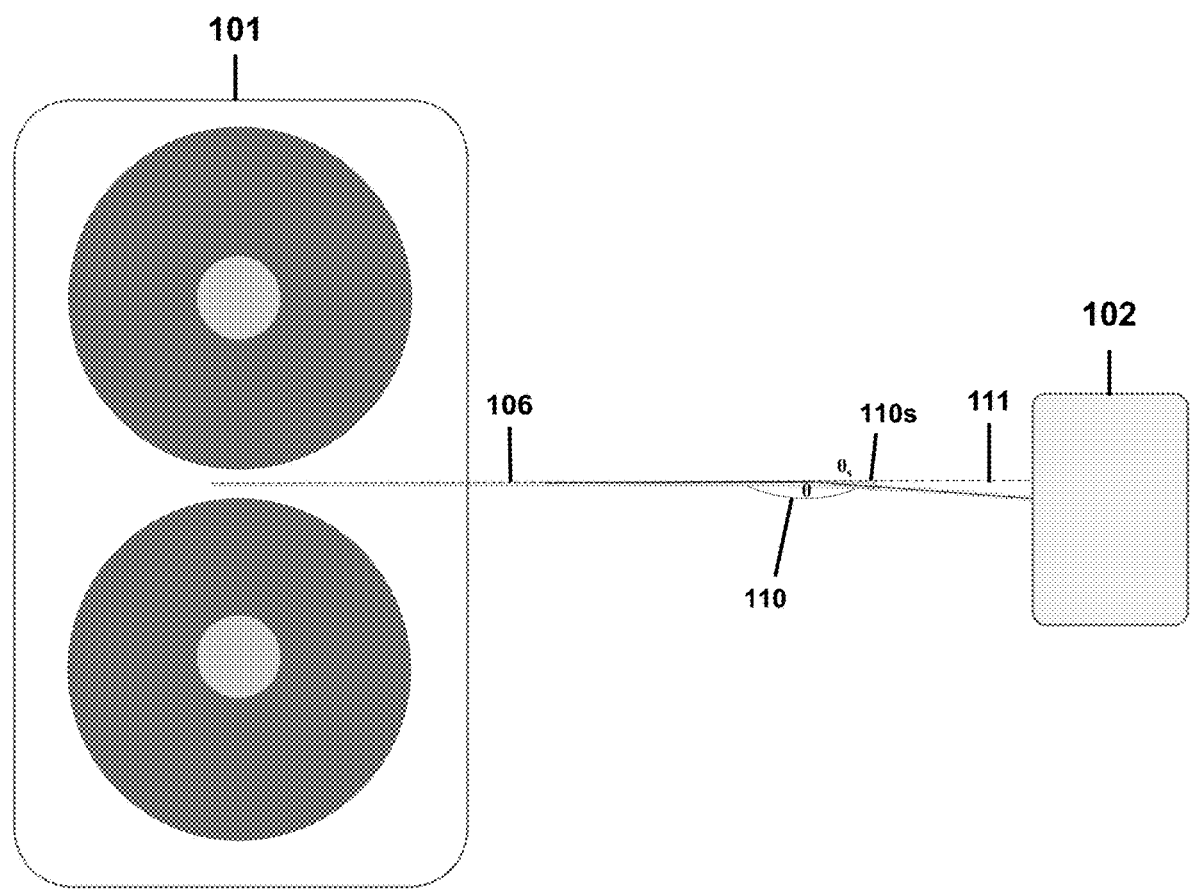
FIG. 3A illustrates an example of a web path in accordance with some embodiments disclosed herein.

In some embodiments, the bend angle can be less than 180 degrees (e.g. the web path of the densified electrode film is not a perfectly straight line), and the bend angle can be defined as an angle that is supplementary to an acute angle formed between the densified electrode film and a neutral axis between the laminator exit and notcher entrance. For example, FIG. 3A depicts a web path of a densified electrode film 106 from laminator 101 to notcher 102 in which bend angle 110 is supplementary to acute angle 110s that is formed between densified electrode film 106 and a neutral axis 111 between the laminator 101 exit and notcher 102 entrance.

Figure 3B:
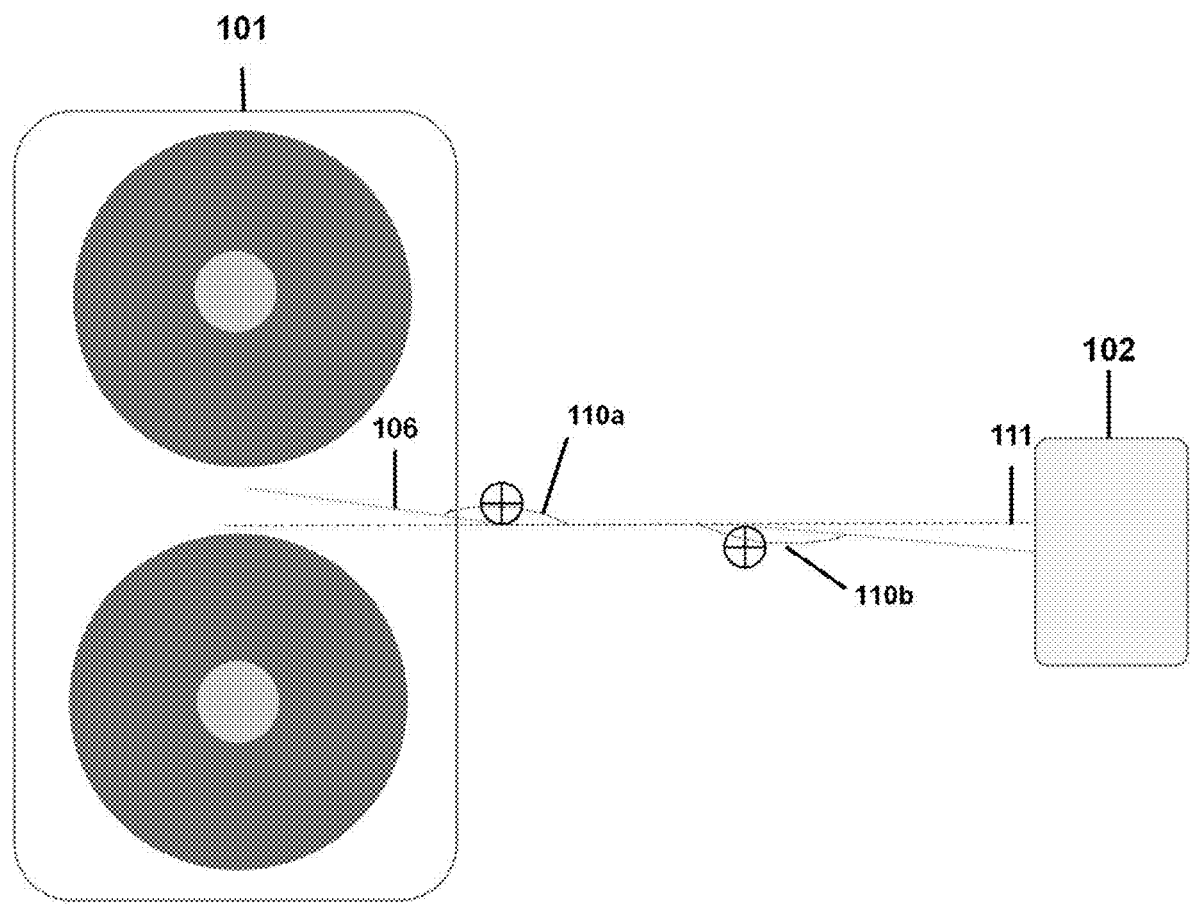
FIG. 3B illustrates another example of a web path in accordance with some embodiments disclosed herein.

As shown in FIG. 3B, in some embodiments, a web path of a densified electrode film 106 between laminator 101 and notcher 102 can have more than one bend angle, and each bend angle can be greater than about 165 degrees. For example, a first bend angle 110a and a second bend angle 110b in FIG. 3B can each be greater than about 165 degrees relative to neutral axis 111 between laminator 101 exit and notcher 102 entrance. As such, any bend of the densified electrode film 106 between the laminator 101 exit and notcher 102 entrance will have a bend angle greater than 165 degrees.

Figure 3C:
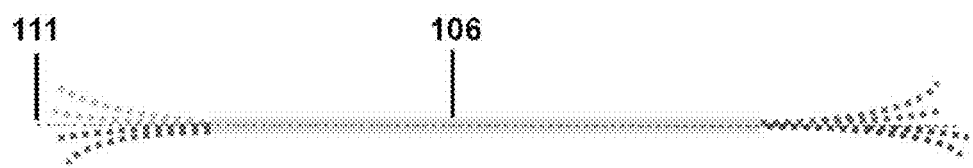
FIG. 3C illustrates examples of bend angles in accordance with some embodiments disclosed herein.

In some embodiments, a bend angle of a web path of densified electrode film 106 can be in a positive or a negative direction relative to neutral axis 111. For example, dashed lines in FIG. 3C depict various ways in which densified electrode film 106 can bend that could result in the formation of bend angles measured in both positive and negative directions relative to neutral axis 111. However, the bend angle will be the absolute value such that the bend angle will be positive (e.g., greater than 165 degrees) despite a bend angle measured in the negative direction relative to neutral axis 111.

Figure 4:
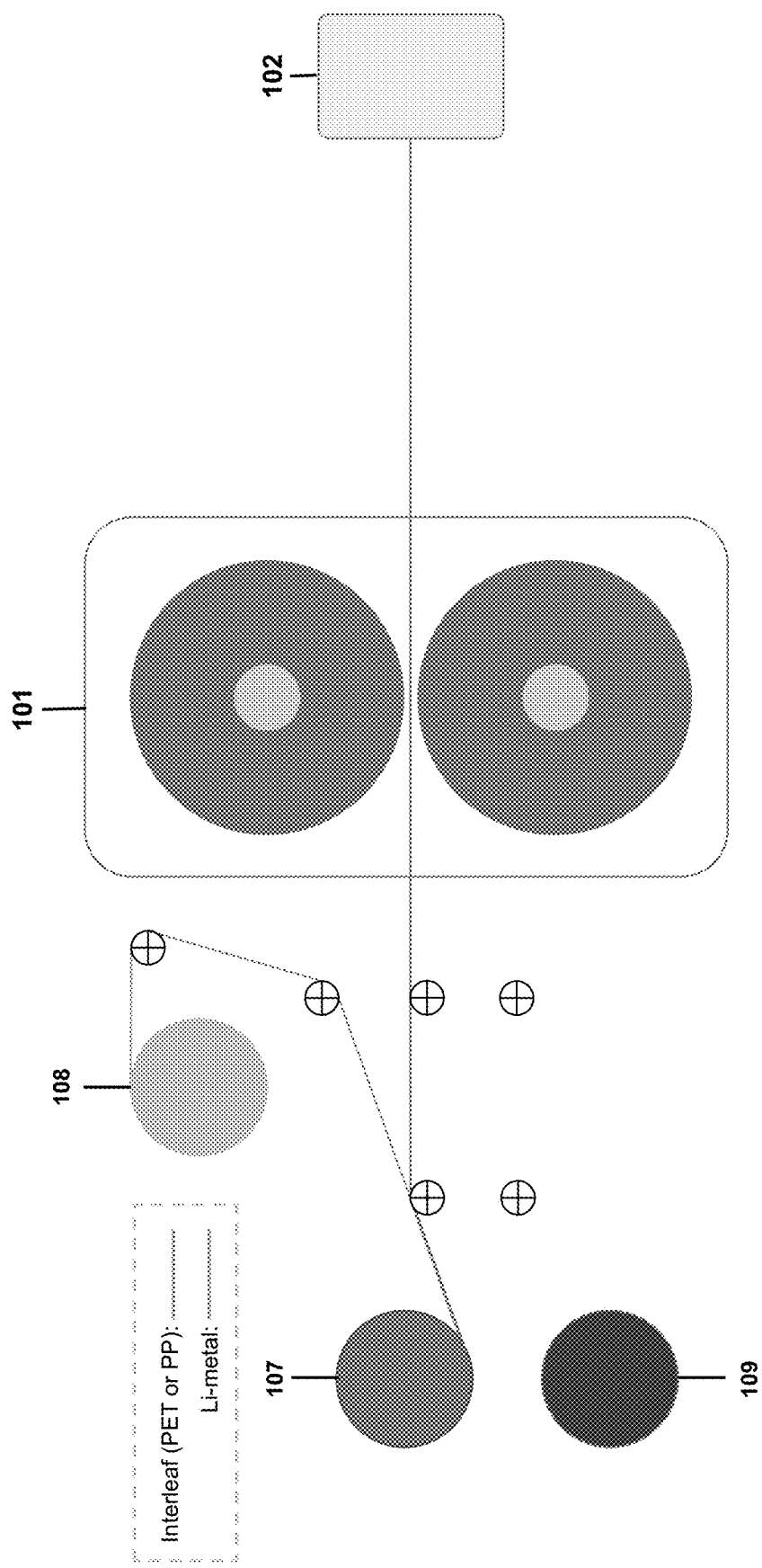
FIG. 4 illustrates another exemplary layout of a laminator and notcher system in accordance with some embodiments disclosed herein.

In some embodiments, the system described herein can have one or more unwinders configured to unwind a roll of electrode film. In some embodiments, the laminator can be configured to receive the unwound electrode film from the at least one electrode unwinder. For example, the electrode film can travel along a web path to the laminator once it is unwound. In some embodiments, if the electrode film is already at a desired final density when it is unwound, the electrode film can pass through the laminator without being densified further. For example, as shown in FIG. 4, the electrode film 107 can be lithium metal, which can be at a final density upon being unwound and can thus bypass laminator 101. When bypassing laminator 101, electrode film 107 can pass through laminator 101 without being densified further. As such, the system can be configured so that laminator 101 will be bypassed depending on the density of the electrode film 107 that is used.

In some embodiments, the system described herein can also have one or more solid electrolyte unwinders configured to unwind a roll of solid electrolyte film. In some embodiments, the laminator can be configured to receive the unwound solid electrolyte film from the at least one solid electrolyte unwinder. The number and arrangement of the solid electrolyte unwinders can depend on the desired design and geometry of the resulting battery cell component. For example, as shown in FIG. 1, there can be two solid electrolyte unwinders 104a and 104b arranged such that the resulting densified electrode film 106 can have an electrode layer 103a sandwiched between electrolyte layers 104c. As shown in FIG. 1, after passing through the laminator, electrolyte layers 104c can be bonded to a first and second surface of electrode layer 103a to sandwich the electrode layer 103a between electrolyte layers 104c.

Alternatively, in some embodiments there can be one solid electrolyte unwinder depending on the desired configuration of the resulting battery cell component. For example, if there is one solid electrolyte unwinder, an electrolyte film or layer can be bonded to a surface of the electrode film after passing through the laminator. This can result in a battery cell component that could be stacked with other similar components in a magazine so as to form alternating layers of electrode and solid electrolyte. Additional electrode unwinders and solid electrolyte unwinders can be added depending on the desired configuration of the resulting densified electrode film.

In some embodiments, the substrate layer of the solid electrolyte film can be removed before or after laminator. In some embodiments, the system can include at least one rewinder configured to rewind the substrate layer into a substrate roll from the solid electrolyte film before or after lamination.

Figure 2:
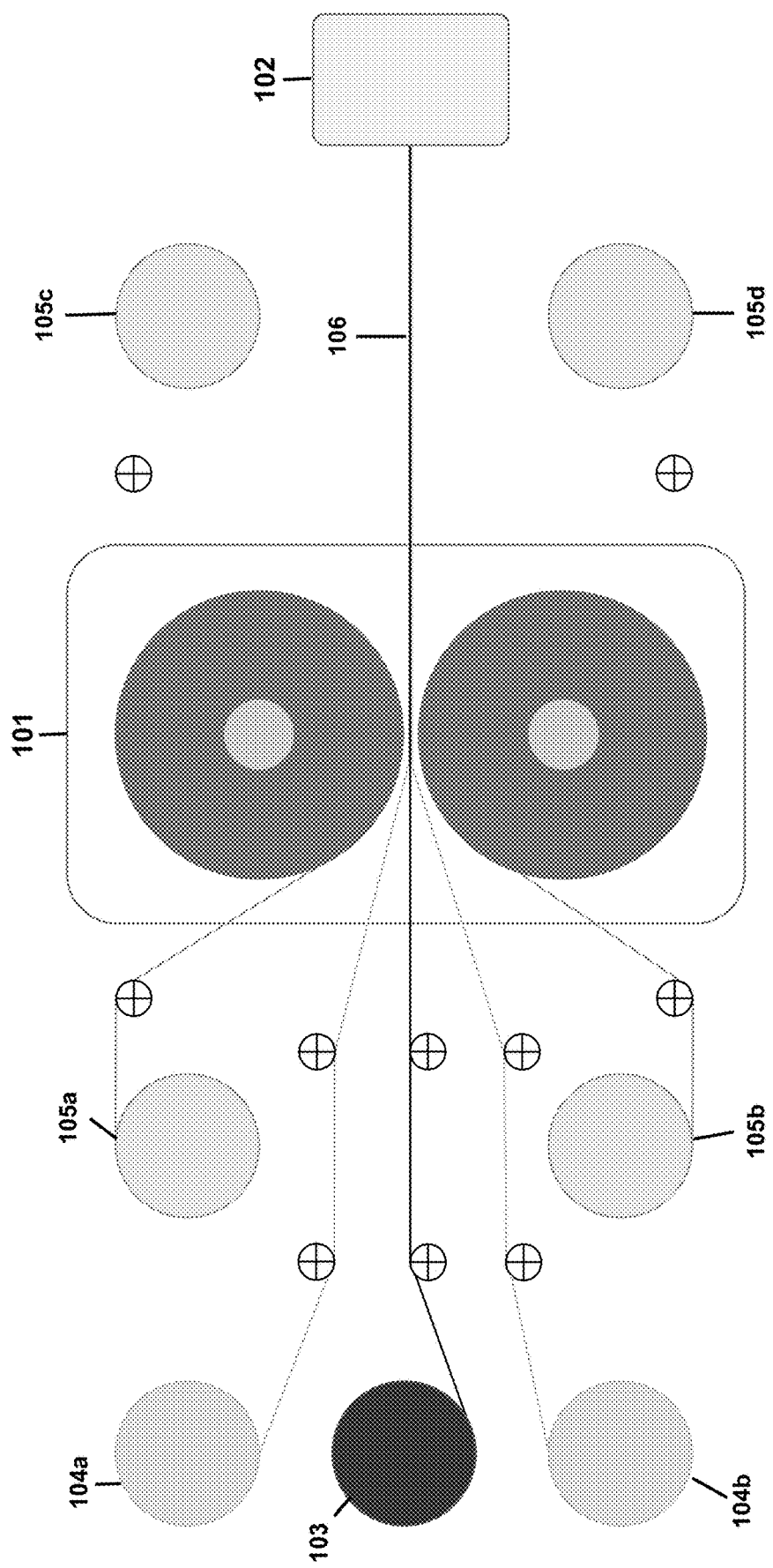
FIG. 2 illustrates another exemplary layout of a laminator and notcher system in accordance with some embodiments disclosed herein.

As shown in FIG. 2, in some embodiments, the system described herein can further comprise one or more substrate rewinders 105a and 105b before laminator 101 that are configured to rewind a substrate layer of the solid electrolyte film after the solid electrolyte film is unwound by solid electrolyte unwinder 104a/104b but before the solid electrolyte film enters the laminator 101. In some embodiments, the substrate layer can be separated from the unwound solid electrolyte film. In some embodiments, at least one rewinder can be configured to rewind the separated substrate layer from the unwound solid electrolyte film. In some embodiments, the laminator can be configured to receive at least the electrolyte layer of the solid electrolyte film (i.e., the substrate layer was removed and will not enter the laminator).

One or more substrate rewinders can be present depending on corresponding configuration of solid electrolyte unwinders and the desired configuration of the final densified film. For example, if there are two solid electrolyte unwinders, the desired configuration of the densified film may be the electrode layer sandwiched between electrolyte layers. In some embodiments, the substrate rewinders can be before or after the laminator.

In some embodiments, the substrate layer may be removed/separated from an electrolyte layer of the solid electrolyte film by the pressure from the laminator. In some embodiments, the substrate layer can also be casted onto the electrolyte layer such that pressure from the laminator can separate the substrate layer from the electrolyte layer. Casted substrates can be included in the solid electrolyte film to provide structural support for the electrolyte layer as it passes through the laminator. However, the substrate layer may not be a desired component of the final densified film. Casted substrates can include a metal that can withstand the pressure exerted by the laminator. As such, some substrate layers (e.g., casted substrates) can pass through the laminator and can be separated from the densified electrode film and rewound after lamination.

As shown in FIG. 1, the system described herein can include one or more substrate rewinders 105c and 105d after laminator 101 but before notcher 102 that are configured to rewind the substrate layer from the densified electrode film 106 after the substrate layer is separated from it during lamination. One or more substrate rewinders can be present depending on corresponding configuration of solid electrolyte unwinders and the desired configuration of the final densified film.

In some embodiments, an electrode film 107 can include an electrode layer and a substrate layer. As shown in FIG. 4, the electrode layer can be lithium metal, and the substrate layer can be an interleaf film or layer. The interleaf film or layer can help prevent the electrode film (e.g., lithium layers) from adhering to one another during storage and/or protect the electrode film. As such, the system can include a rewinder 108 that is configured to rewind the substrate layer of the electrode film into a roll. As shown in FIG. 4, if the electrode film includes a substrate layer, as with lithium metal having an interleaf film, the substrate layer can be rewound in a rewinder 108. In some embodiments, the electrode layer can be able to bypass the laminator after the substrate layer is rewound if the electrode layer enters the system at a desired final density. For example, as shown in FIG. 4, electrode film 107 can pass through laminator 101 without being densified further because the electrode film (e.g., lithium metal) may already be at a final density upon entering the system. The system can be configured so that laminator 101 can be bypassed depending on the density of the electrode film 107 that is used.

Figure 5:
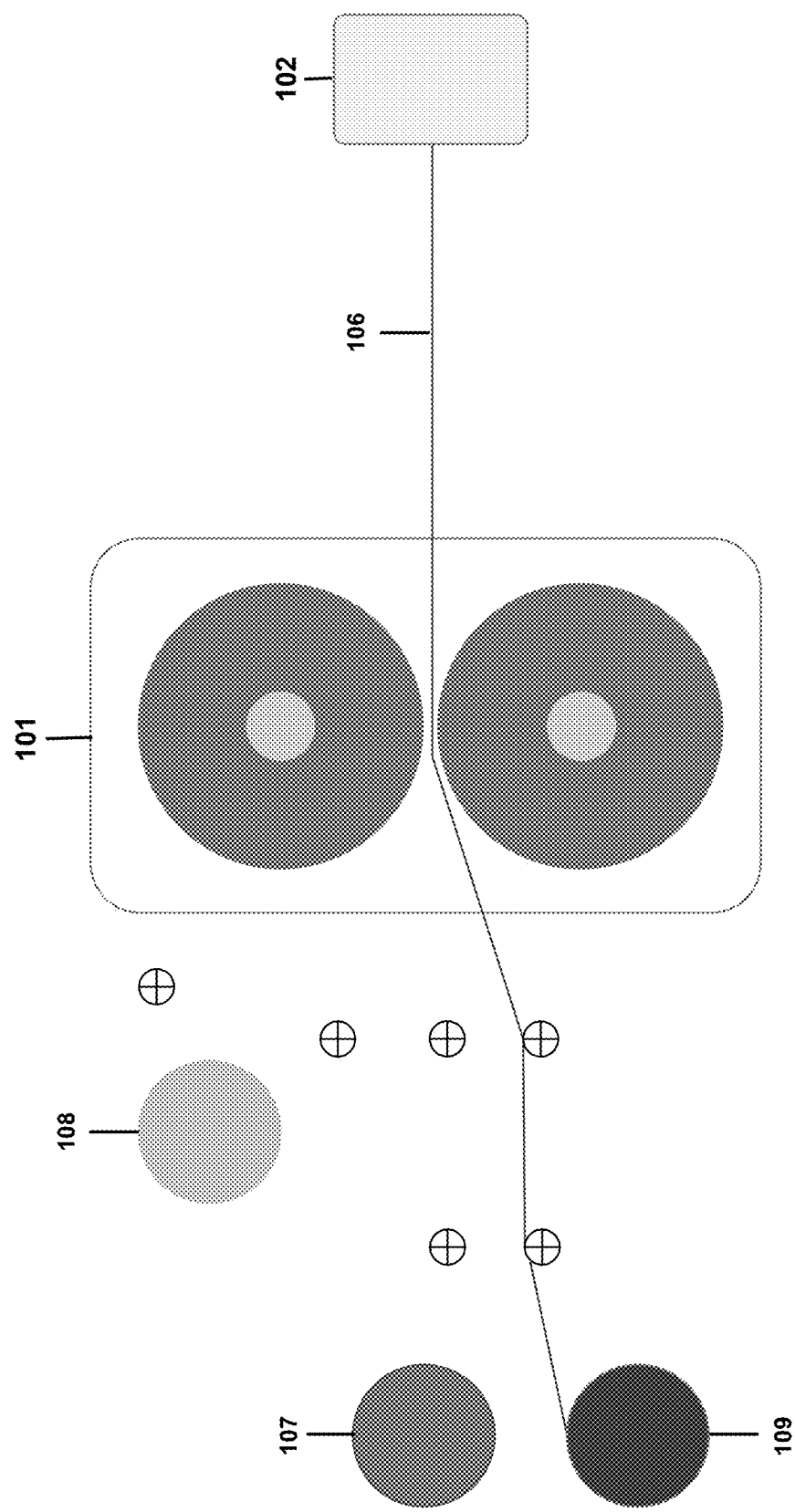
FIG. 5 illustrates another exemplary layout of a laminator and notcher system in accordance with some embodiments disclosed herein.

As shown in FIG. 5, in some embodiments, the system described herein can be configured to densify an electrode. For example, there can be one electrode unwinder 109 without the use of other unwinders 107 and rewinders 108. In some embodiments, the electrode film can be densified by laminator 101 into a densified electrode film 106 before entering notcher 102. In some embodiments, the electrode film can be densified by the laminator without any layers of solid electrolyte. For example, electrode unwinder 109 can unwind an electrode film that is an anode including silicon, and the silicon can be densified by laminator 101 into a densified electrode film 106 without any layers of solid electrolyte.

The system and methods described herein can be used for various purposes. In some embodiments, the system can be used for the lamination of stand-alone electrodes. In some embodiments, the system can be used for the assembly of solid-state battery cells comprising a cathode and anode separated by a SES. More unwinders and rewinders can be added to the system to accommodate additional web paths and components.

Battery Cells, Battery Modules, Battery Packs, and Electric Vehicle Systems

After the densified electrode film has been created, it can be inserted into a battery cell, which can be used as an electrical energy source. For example, the densified electrodes or densified electrode films disclosed herein can be used as an electrode layer (e.g., cathode or anode layer), an electrolyte layer, or an electrode and electrolyte layer.

Reference will now be made to implementations and embodiments of various aspects and variations of battery cells, battery modules, battery packs, and the methods of making such battery cells, battery modules, and battery packs. Although several exemplary variations of the battery cells, modules, packs, and methods of making them are described herein, other variations of the battery cells, modules, packs and methods may include aspects of the battery cells, modules, packs and methods described herein combined in any suitable manner having combinations of all or some of the aspects described. In addition, any part of or any of the electrodes, densified electrodes, components, systems, methods, apparatuses, devices, compositions, etc. described herein can be implemented into the battery cells, battery modules, battery packs, and methods of making these battery cells, battery modules, and battery packs.

Figure 6:
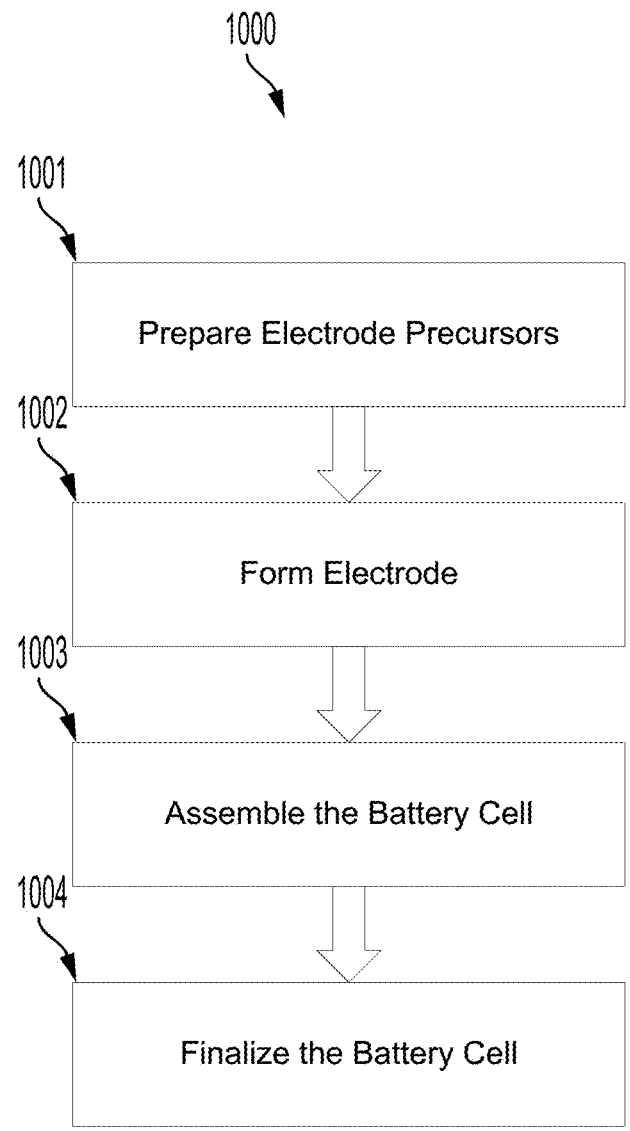
FIG. 6 illustrates a flow chart for a typical battery cell manufacturing process in accordance with some embodiments disclosed herein.

FIG. 6 illustrates a flow chart for a typical battery cell manufacturing process 1000. These steps are not exhaustive and other battery cell manufacturing processes can include additional steps or only a subset of these steps. At step 1001, the electrode precursors (e.g., binder, active material, conductive carbon additive) can be prepared. In some embodiments, this step can include mixing electrode materials (e.g., active materials) with additional components (e.g., binders, solvents, conductive additives, etc.) to form an electrode slurry. In some embodiment, this step can include synthesizing the electrode materials themselves.

At step 1002, the electrode can be formed. In some embodiments, this step can include coating an electrode slurry on a current collector. After coating, the coated current collector can be dried to evaporate any solvent. In some embodiments, this step can include calendaring the coated current collectors. Calendaring can adjust the physical properties (e.g., bonding, conductivity, density, porosity, etc.) of the electrodes. In some embodiments, the electrode can then be sized via a slitting and/or notching machine to cut the electrode into the proper size and/or shape.

At step 1003, the battery cell can be assembled. After the electrodes, separators, and/or electrolytes have been prepared, a battery cell can be assembled/prepared. In this step, the separator and/or an electrolyte layer can be assembled between the anode and cathode layers to form the internal structure of a battery cell. These layers can be assembled by a winding method such as a round winding or prismatic/flat winding, a stacking method, or a z-folding method. The assembled cell structure can then be inserted into a cell housing which is then partially or completed sealed. In addition, the assembled structure can be connected to terminals and/or cell tabs (via a welding process). For battery cells utilizing a liquid electrolyte, the housed cell with the electrode structure inside it can also be filled with electrolyte and subsequently sealed.

Battery cells can have a variety of form factors, shapes, or sizes. For example, battery cells (and their housings/casings) can have a cylindrical, rectangular, square, cubic, flat, or prismatic form factor, among others. There are four main types of battery cells: (1) button or coin cells; (2) cylindrical cells; (3) prismatic cells; and (4) pouch cells. Battery cells can be assembled, for example, by inserting a winding and/or stacked electrode roll (e.g., a jellyroll) into a battery cell casing or housing. In some embodiments, the winded or stacked electrode roll can include the electrolyte material. In some embodiments, the electrolyte material can be inserted in the battery casing or housing separate from the electrode roll. In some embodiments, the electrolyte material includes, but is not limited to, an ionically conductive fluid or other material (e.g., a layer) that can allow the flow of electrical charge (i.e., ion transportation) between the cathode and anode. In some embodiments, the electrolyte material can include a non-aqueous polar solvent (e.g., a carbonate such as ethylene carbonate, propylene carbonate, diethyl carbonate, ethyl methyl carbonate, dimethyl carbonate, or a mixture of any two or more thereof). The electrolytes may also include other additives such as, but not limited to, vinylidene carbonate, fluoroethylene carbonate, ethyl propionate, methyl propionate, methyl acetate, ethyl acetate, or a mixture of any two or more thereof. The lithium salt of the electrolyte may be any of those used in lithium battery construction including, but not limited to, lithium perchlorate, lithium hexafluorophosphate, lithium bis(fluorosulfonyl)imide, lithium bis(trifluorosulfonyl)imide, or a mixture of any two or more thereof. In addition, the salt may be present in the electrolyte from greater than 0 M to about 0.5 M.

Figure 7:
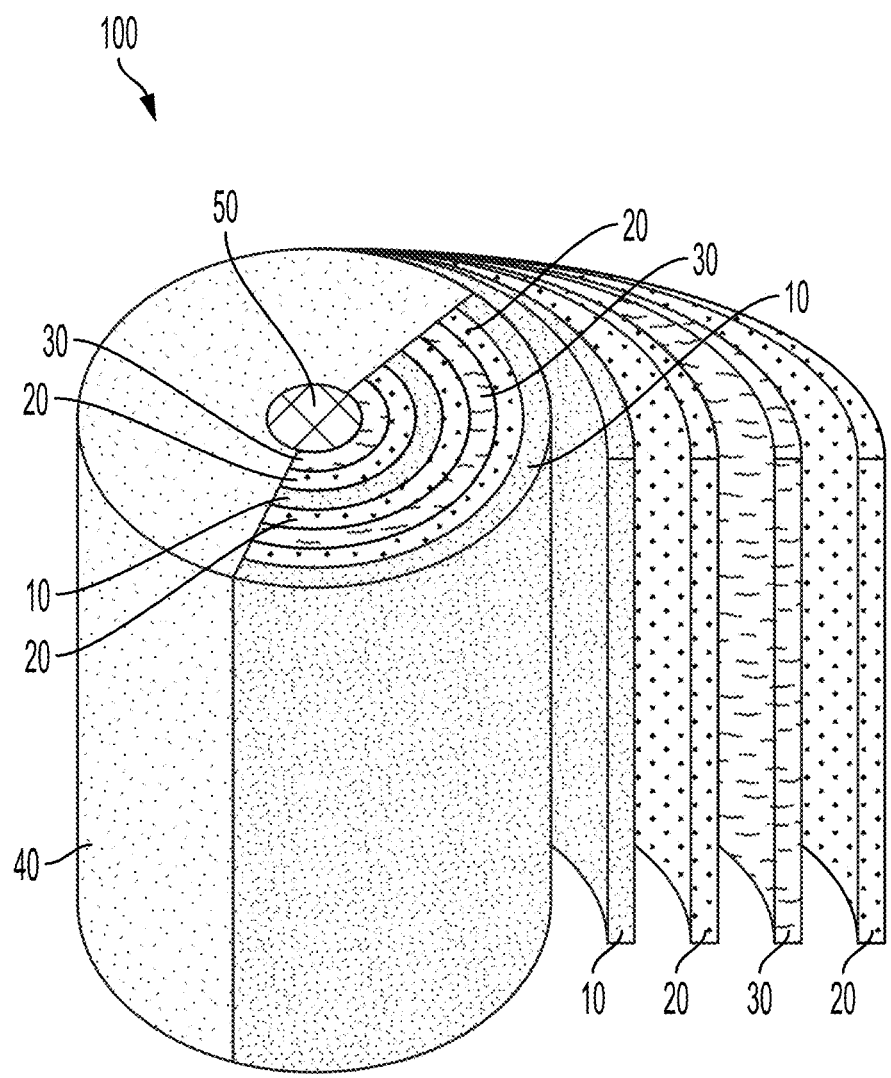
FIG. 7 depicts an illustrative example of a cross sectional view of a cylindrical battery cell in accordance with some embodiments disclosed herein.

FIG. 7 depicts an illustrative example of a cross sectional view of a cylindrical battery cell 100. The cylindrical battery cell can include layers (e.g., sheet-like layers) of anode layers 10, separator and/or electrolyte layers 20, and cathode layers 30.

A battery cell can include at least one anode layer, which can be disposed within the cavity of the housing/casing. The battery cell can also include at least one cathode layer. The at least one cathode layer can also be disposed within the housing/casing. In some embodiments, when the battery cell is discharging (i.e., providing electric current), the at least one anode layer releases ions (e.g., lithium ions) to the at least one cathode layer generating a flow of electrons from one side to the other. Conversely, in some embodiments, when the battery cell is charging, the at least one cathode layer can release ions and the at least one anode layer can receive these ions.

These layers (cathode, anode, separator/electrolyte layers) can be sandwiched, rolled up, and/or packed into a cavity of a cylinder-shaped casing 40 (e.g., a metal can). The casings/housings can be rigid such as those made from metallic or hard-plastic, for example. In some embodiments, a separator layer (and/or electrolyte layer) 20 can be arranged between an anode layer 10 and a cathode layer 30 to separate the anode layer 20 and the cathode layer 30. In some embodiments, the layers in the battery cell can alternate such that a separator layer (and/or electrolyte layer) separates an anode layer from a cathode layer. In other words, the layers of the battery electrode can be (in order) separator layer, anode/cathode layer, separator layer, opposite of other anode/cathode layer and so on. The separator layer (and/or electrolyte layer) 20 can prevent contact between the anode and cathode layers while facilitating ion (e.g., lithium ions) transport in the cell. The battery cell can also include at least one terminal 50. The at least one terminal can be electrical contacts used to connect a load or charger to a battery cell. For example, the terminal can be made of an electrically conductive material to carry electrical current from the battery cell to an electrical load, such as a component or system of an electric vehicle as discussed further herein.

Figure 8:
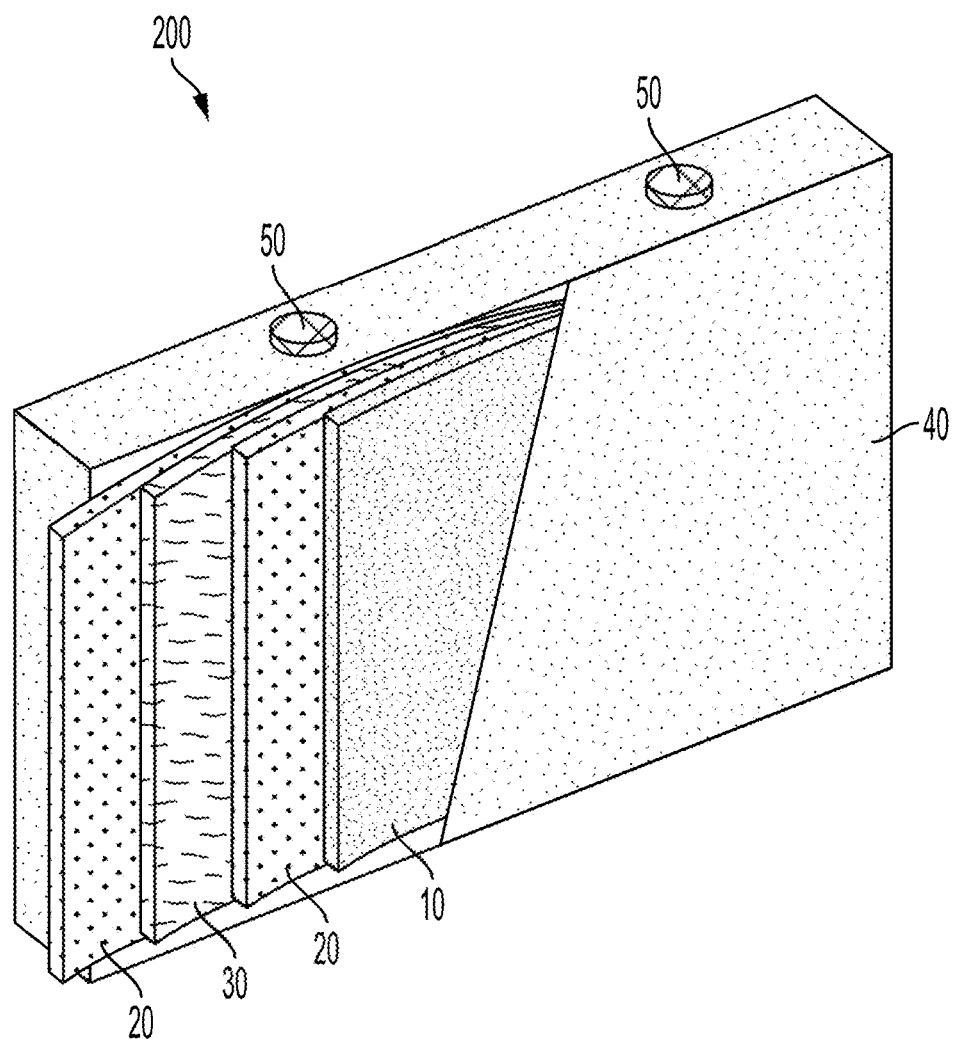
FIG. 8 depicts an illustrative example of a cross sectional view of a prismatic battery cell in accordance with some embodiments disclosed herein.

FIG. 8 depicts an illustrative example of a cross sectional view of a prismatic battery cell 200. The prismatic battery cell can include layers (e.g., sheet-like layers) of anode layers 10, separator and/or electrolyte layers 20, and cathode layers 30. Similar to the cylindrical battery cell, the layers of a prismatic battery cell can be sandwiched, rolled, and/or pressed to fit into cubic or rectangular cuboid (e.g., hyperrectangle) shaped casing/housing 40. In some embodiments, the layers can be assembled by layer stacking rather than jelly rolling. In some embodiments, the casing or housing can be rigid such as those made from a metal and/or hard-plastic. In some embodiments, the prismatic battery cell 200 can include more than one terminal 50. In some embodiments, one of these terminals can be the positive terminal and the other a negative terminal. These terminals can be used to connect a load or charger to the battery cell.

Figure 9:
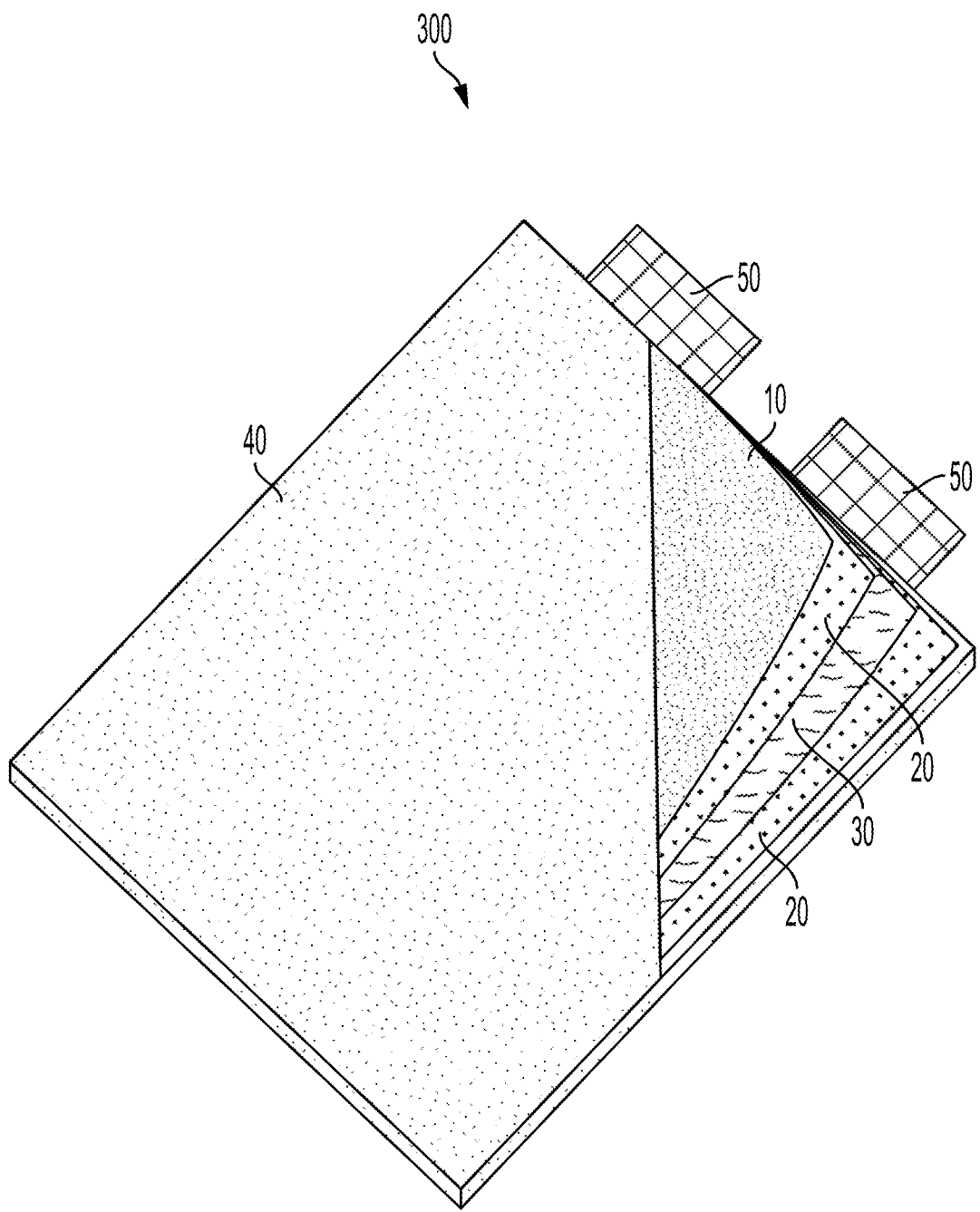
FIG. 9 depicts an illustrative example of a cross section view of a pouch battery cell in accordance with some embodiments disclosed herein.

FIG. 9 depicts an illustrative example of a cross section view of a pouch battery cell 300. The pouch battery cells do not have a rigid enclosure and instead use a flexible material for the casing/housing 40. This flexible material can be, for example, a sealed flexible foil. The pouch battery cell can include layers (e.g., sheet-like layers) of anode layers 10, separator and/or electrolyte layers 20, and cathode layers 30. In some embodiments, these layers are stacked in the casing/housing. In some embodiments, the pouch battery cell 200 can include more than one terminal 50. In some embodiments, one of these terminals can be the positive terminal and the other the negative terminal. These terminals can be used to connect a load or charger to the battery cell.

The casings/housings of battery cells can include one or more materials with various electrical conductivity or thermal conductivity, or a combination thereof. In some embodiments, the electrically conductive and thermally conductive material for the casing/housing of the battery cell can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. In some embodiments, the electrically conductive and thermally conductive material for the housing of the battery cell can include a ceramic material (e.g., silicon nitride, silicon carbide, titanium carbide, zirconium dioxide, beryllium oxide, and among others) and/or a thermoplastic material (e.g., polyethylene, polypropylene, polystyrene, polyvinyl chloride, or nylon), among others.

At step 1004, the battery cell can be finalized. In some embodiments, this step includes the formation process wherein the first charging and discharging process for the battery cell takes place. In some embodiments, this initial charge and discharge can form a solid electrolyte interface between the electrolyte and the electrodes. In some embodiments, this step may cause some of the cells to produce gas which can be removed in a degassing process from the battery cell. In some embodiments, this step includes aging the battery cell. Aging can include monitoring cell characteristics and performance over a fixed period of time. In some embodiments, this step can also include testing the cells in an end-of-line (EOL) test rig. The EOL testing can include discharging the battery cells to the shipping state of charge, pulse testing, testing internal resistance measurements, testing OCV, testing for leakage, and/or optically inspecting the battery cells for deficiencies.

Figure 10:
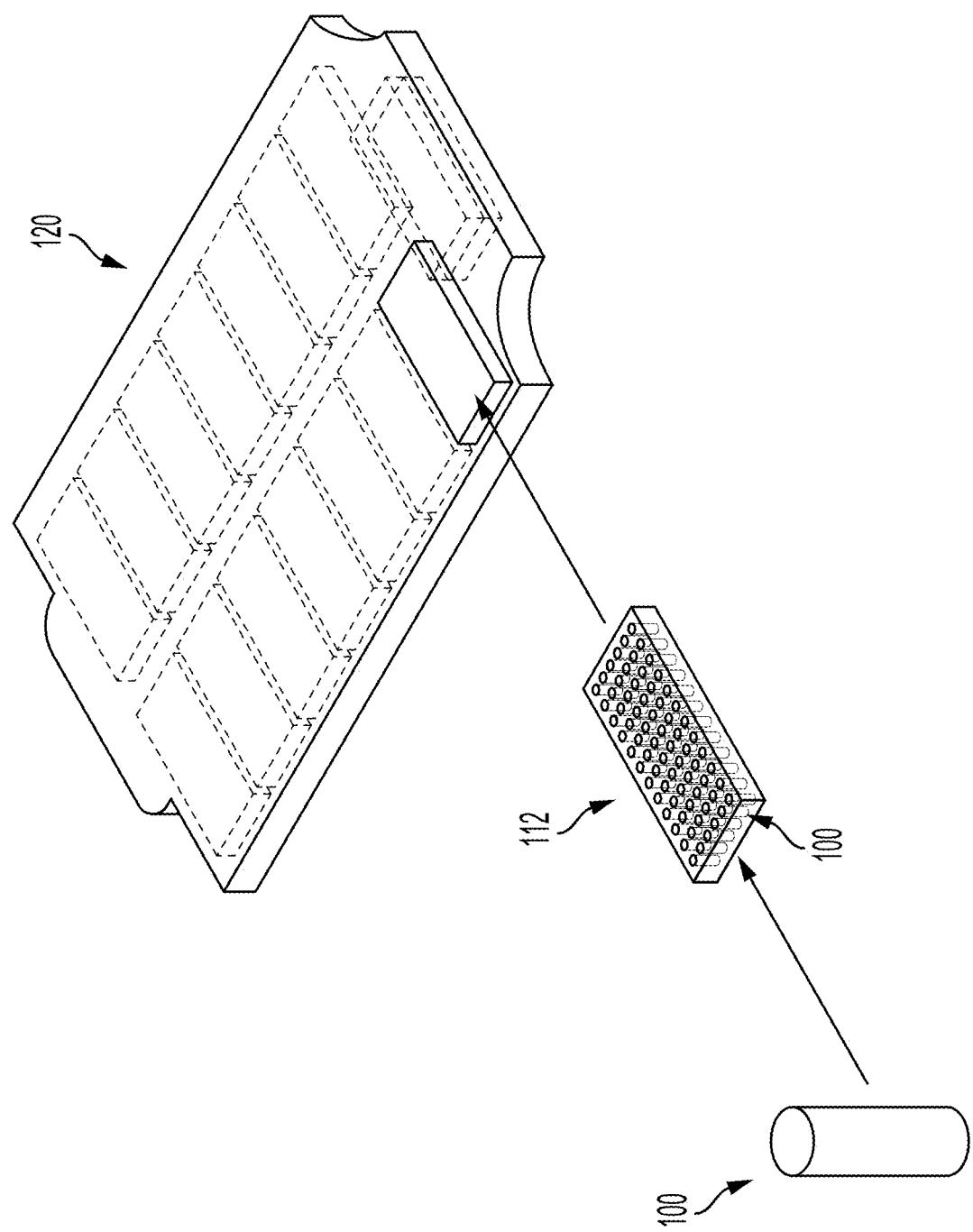
FIG. 10 illustrates cylindrical battery cells being inserted into a frame to form a battery module and pack in accordance with some embodiments disclosed herein.
Figure 11:
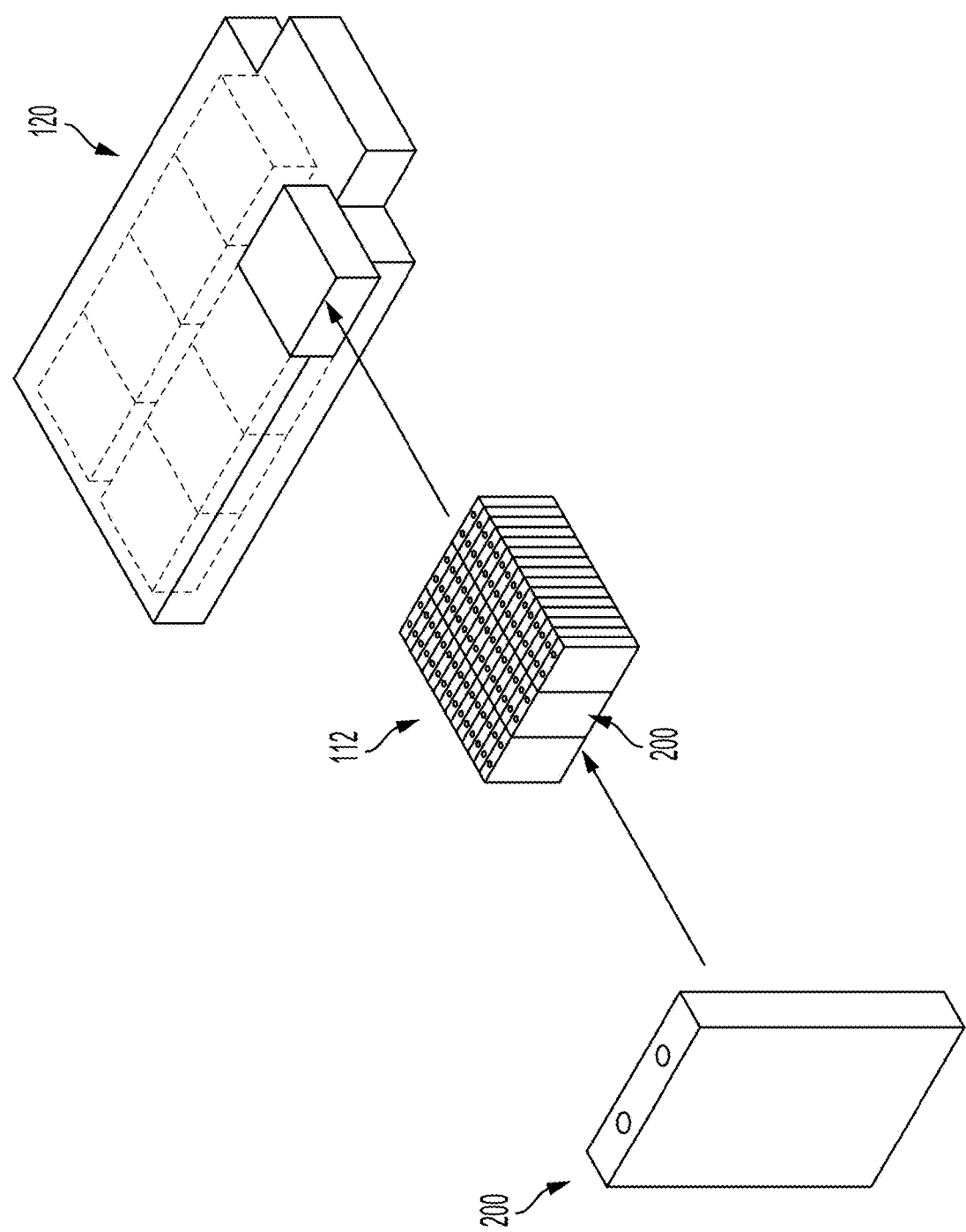
FIG. 11 illustrates prismatic battery cells being inserted into a frame to form a battery module and pack in accordance with some embodiments disclosed herein.
Figure 12:
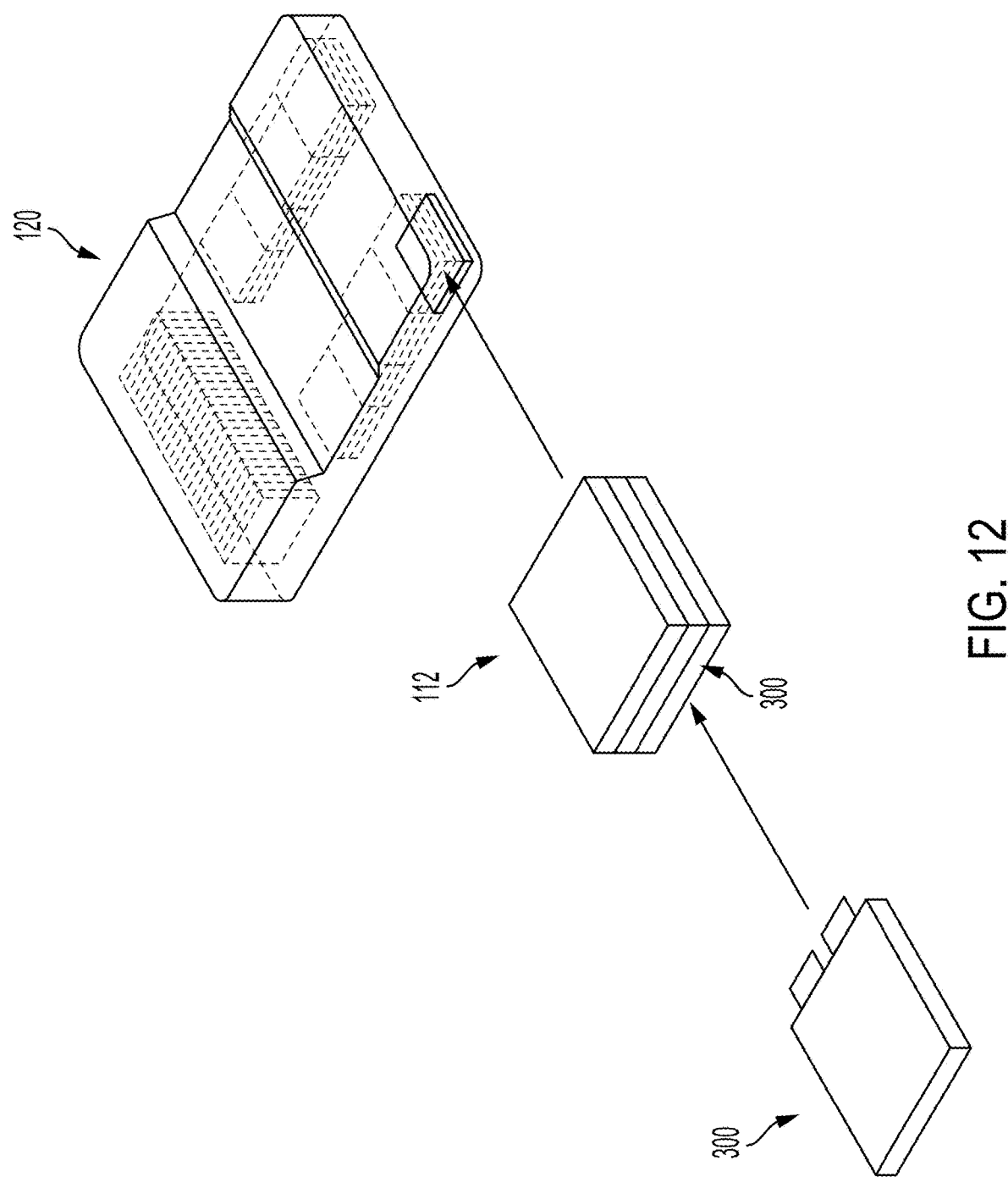
FIG. 12 illustrates pouch battery cells being inserted into a frame to form a battery module and pack in accordance with some embodiments disclosed herein.

A plurality of battery cells (100, 200, and/or 300) can be assembled or packaged together in the same housing, frame, or casing to form a battery module and/or battery pack. The battery cells of a battery module can be electrically connected to generate an amount of electrical energy. These multiple battery cells can be linked to the outside of the housing, frame, or casing, through a uniform boundary. The battery cells of the battery module can be in parallel, in series, or in a series-parallel combination of battery cells. The housing, frame, or casing can protect the battery cells from a variety of dangers (e.g., external elements, heat, vibration, etc.). FIG. 10 illustrates cylindrical battery cells 100 being inserted into a frame to form battery module 112. FIG. 11 illustrates prismatic battery cells 200 being inserted into a frame to form battery module 112. FIG. 12 illustrates pouch battery cells 300 being inserted into a frame to form battery module 112. In some embodiments, the battery pack may not include modules. For example, the battery pack can have a "module-free" or cell-to-pack configuration wherein battery cells are arranged directly into a battery pack without assembly into a module.

A plurality of the battery modules 112 can be disposed within another housing, frame, or casing to form a battery pack 120 as shown in FIGS. 10-12. In some embodiments, a plurality of battery cells can be assembled, packed, or disposed within a housing, frame, or casing to form a battery pack (not shown). In such embodiments, the battery pack may not include a battery module (e.g., module-free). For example, the battery pack can have a module-free or cell-to-pack configuration where the battery cells can be arranged directly into a battery pack without assembly into a battery module. In some embodiments, the battery cells of the battery pack can be electrically connected to generate an amount of electrical energy to be provided to another system (e.g., an electric vehicle).

The battery modules of a battery pack can be electrically connected to generate an amount of electrical energy to be provided to another system (e.g., an electric vehicle). The battery pack can also include various control and/or protection systems such as a heat exchanger system (e.g., a cooling system) configured to regulate the temperature of the battery pack (and the individual modules and battery cells) and a battery management system configured to control the battery pack's voltage, for example. In some embodiments, a battery pack housing, frame, or casing can include a shield on the bottom or underneath the battery modules to protect the battery modules from external elements. In some embodiments, a battery pack can include at least one heat exchanger (e.g., a cooling line configured to distribute fluid through the battery pack or a cold plate as part of a thermal/temperature control or heat exchange).

In some embodiments, battery modules can collect current or electrical power from the individual battery cells that make up the battery modules and can provide the current or electrical power as output from the battery pack. The battery modules can include any number of battery cells and the battery pack can include any number of battery modules. For example, the battery pack can have one, two, three, four, five, six, seven, eight, nine, ten, eleven, twelve or other number of battery modules disposed in the housing/frame/casing. In some embodiments, a battery module can include multiple submodules. In some embodiments, these submodules may be separated by a heat exchanger configured to regulate or control the temperature of the individual battery module. For example, a battery module can include a top battery submodule and a bottom battery submodule. These submodules can be separated by a heat exchanger such as a cold plate in between the top and bottom battery submodules.

The battery packs can come in all shapes and sizes. For example, FIGS. 10-12 illustrates three differently shaped battery packs 120. As shown in FIGS. 10-12, the battery packs 120 can include or define a plurality of areas, slots, holders, containers, etc. for positioning of the battery modules. The battery modules can come in all shapes and sizes. For example, the battery modules can be square, rectangular, circular, triangular, symmetrical, or asymmetrical. In some examples, battery modules in a single battery pack may be shaped differently. Similarly, the battery module can include or define a plurality of areas, slots, holders, containers, etc. for the plurality of battery cells.

Figure 13:
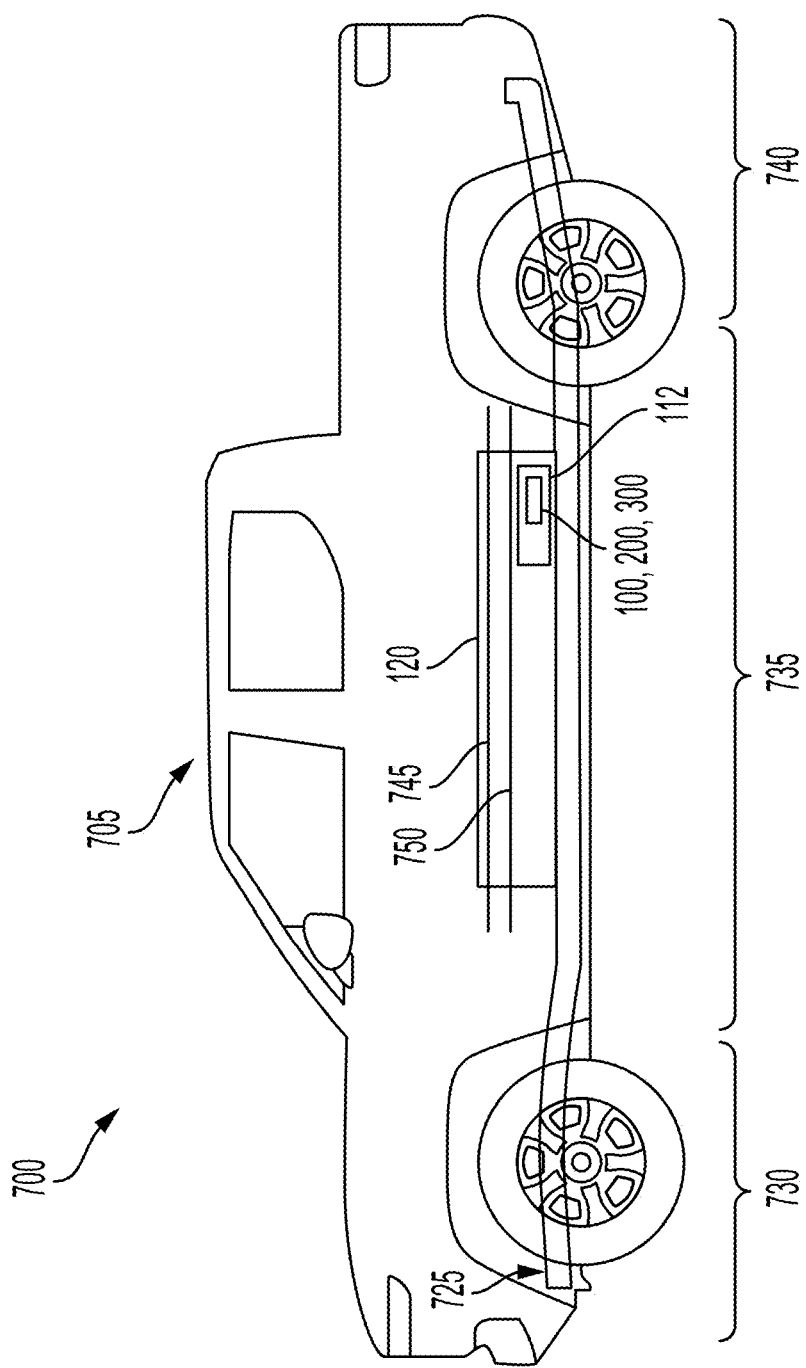
FIG. 13 illustrates an example of a cross sectional view of an electric vehicle that includes at least one battery pack in accordance with some embodiments disclosed herein.

FIG. 13 illustrates an example of a cross sectional view 700 of an electric vehicle 705 that includes at least one battery pack 120. Electric vehicles can include, but are not limited to, electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Electric vehicles can be fully electric or partially electric (e.g., plug-in hybrid) and further, electric vehicles can be fully autonomous, partially autonomous, or unmanned. In addition, electric vehicles can also be human operated or non-autonomous.

Electric vehicles 705 can be installed with a battery pack 120 that includes battery modules 112 with battery cells (100, 200, and/or 300) to power the electric vehicles. The electric vehicle 705 can include a chassis 725 (e.g., a frame, internal frame, or support structure). The chassis 725 can support various components of the electric vehicle 705. In some embodiments, the chassis 725 can span a front portion 730 (e.g., a hood or bonnet portion), a body portion 735, and a rear portion 740 (e.g., a trunk, payload, or boot portion) of the electric vehicle 705. The battery pack 120 can be installed or placed within the electric vehicle 705. For example, the battery pack 120 can be installed on the chassis 725 of the electric vehicle 705 within one or more of the front portion 730, the body portion 735, or the rear portion 740. In some embodiments, the battery pack 120 can include or connect with at least one busbar, e.g., a current collector element. For example, the first busbar 745 and the second busbar 750 can include electrically conductive material to connect or otherwise electrically couple the battery pack 120 (and/or battery modules 112 or the battery cells 100, 200, and/or 300) with other electrical components of the electric vehicle 705 to provide electrical power to various systems or components of the electric vehicle 705. In some embodiments, battery pack 120 can also be used as an energy storage system to power a building, such as a residential home or commercial building instead of or in addition to an electric vehicle. Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A system comprising:
   at least one electrode unwinder configured to unwind a continuous electrode film;
   at least one solid electrolyte unwinder configured to unwind a continuous solid electrolyte film;
   a laminator configured to receive the continuous electrode film and the continuous solid electrolyte film, as continuous films, and apply from 0.5 tons to 5 tons to densify the continuous electrode film to a press density of from about 0.5-5 g/cm$^2$ and to bond the continuous electrode film to the continuous solid electrolyte film to form a continuous densified electrode film; and
   a notcher configured to receive the densified electrode film from the laminator and cut the densified electrode film into a plurality of electrodes,
   wherein a web path of the densified electrode film from the laminator to the notcher has a bend angle greater than 165 degrees.

2. The system of claim 1, wherein the laminator is configured to densify the electrode film to a porosity of 0.5-15%.

3. The system of claim 1, wherein the laminator is configured to densify the electrode film to a press density of 1-3 g/cm$^2$.

4. The system of claim 1, further comprising, as the at least one solid electrolyte unwinder, a first electrolyte unwinder configured to unwind a first continuous solid electrolyte film and a second electrolyte unwinder configured to unwind a second continuous solid electrolyte film and wherein the laminator is configured to receive the first and second continuous solid electrolyte films.

5. The system of claim 4, wherein the laminator is configured to bond a first surface of the electrode film to the first continuous solid electrolyte film and a second surface of the electrode film to the second continuous solid electrolyte film to form the densified electrode film.

6. The system of claim 4, wherein the laminator is configured to densify the first and second electrode films to a porosity of 0.5-15%.

7. The system of claim 4, wherein the laminator is configured to densify the first and second electrode films to a press density of 1-3 g/cm$^2$.

8. The system of claim 4, wherein the laminator is configured to densify the first and second continuous electrode films to a porosity of 5-10%.

9. The system of claim 4, wherein the laminator is configured to apply temperatures of about 25° C. to about 150° C. to the first and second continuous solid electrode films.

10. The system of claim 1, wherein the continuous solid electrolyte film further comprises a substrate layer thereon and the system further comprises a substrate rewinder configured to rewind the substrate layer from the continuous solid electrolyte film.

11. The system of claim 10, wherein the substrate rewinder is configured to rewind the substrate layer from the densified electrode film after lamination.

12. The system of claim 10, wherein the substrate rewinder is configured to rewind the substrate layer before lamination.

13. The system of claim 1, wherein the system is configured to separate a substrate layer from the continuous solid electrolyte film before lamination.

14. The system of claim 1, wherein the laminator is configured to densify the continuous electrode film to a porosity of 5-10%.

15. The system of claim 1, wherein the laminator is configured to apply temperatures of about 25° C. to about 150° C. to the continuous solid electrolyte film.

16. The system of claim 1, further comprising:
as the at least one solid electrolyte unwinder, a first electrolyte unwinder configured to unwind a first continuous solid electrolyte film having a first substrate layer thereon and a second electrolyte unwinder configured to unwind a second continuous solid electrolyte film having a second substrate layer thereon; and
a first substrate rewinder configured to rewind the first substrate layer from the first continuous solid electrolyte film and a second substrate rewinder configured to rewind the second substrate layer from the second continuous solid electrolyte film.

17. The system of claim 1, wherein the electrode film comprises a cathode film.

18. The system of claim 1, wherein the electrode film comprises an anode film.

19. The system of claim 1, wherein the laminator is configured to densify the electrode film to a press density of 1-4 g/cm$^2$.

20. The system of claim 1, wherein the web path of the densified electrode film from the laminator to the notcher has a bend angle of about 170-180 degrees.

* * * * *